(12) United States Patent
Ruiz Lara et al.

(10) Patent No.: US 11,192,654 B2
(45) Date of Patent: Dec. 7, 2021

(54) FLEXIBLE HEADREST ASSEMBLY

(71) Applicant: Safran Seats USA LLC, Gainesville, TX (US)

(72) Inventors: Oscar Ruiz Lara, Versailles (FR); Arthur Glain, Boulogne-Billancourt (FR)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/264,453

(22) PCT Filed: Jul. 31, 2018

(86) PCT No.: PCT/IB2018/055739
§ 371 (c)(1),
(2) Date: Jan. 29, 2021

(87) PCT Pub. No.: WO2020/026000
PCT Pub. Date: Feb. 6, 2020

(65) Prior Publication Data
US 2021/0229815 A1    Jul. 29, 2021

(51) Int. Cl.
| | |
|---|---|
| *B64D 11/06* | (2006.01) |
| *B60N 2/806* | (2018.01) |
| *B60N 2/865* | (2018.01) |
| *A47C 7/38* | (2006.01) |

(52) U.S. Cl.
CPC ............ *B64D 11/0642* (2014.12); *A47C 7/38* (2013.01); *B60N 2/806* (2018.02); *B60N 2/865* (2018.02)

(58) Field of Classification Search
None
See application file for complete search history.

(56) References Cited

U.S. PATENT DOCUMENTS

| | | | |
|---|---|---|---|
| 2,591,306 A | 4/1952 | Sherman | |
| 4,153,293 A | 5/1979 | Sheldon | |
| 4,964,418 A * | 10/1990 | Wilson | ................ A61F 5/05883 128/857 |
| 5,161,855 A * | 11/1992 | Harmon | ................ B60N 2/3084 297/238 |

(Continued)

FOREIGN PATENT DOCUMENTS

| | | | |
|---|---|---|---|
| EP | 0434660 A2 | 6/1991 | |
| FR | 2825668 A1 * | 12/2002 | ............. B60N 2/865 |
| WO | 2013142889 A2 | 10/2013 | |

OTHER PUBLICATIONS

International Patent Application No. PCT/IB2018/055739, International Search Report and Written Opinion, dated Jun. 4, 2019.

*Primary Examiner* — David E Allred
(74) *Attorney, Agent, or Firm* — Kilpatrick Townsend & Stockton LLP

(57) ABSTRACT

Described are passenger seat headrest assemblies and seats including headrest assemblies having a semi-rigid flap fixedly connected with an upper portion of the seat back or headrest assembly at a first location and movably connected with the seat back or headrest assembly at a receiving element separated from the first location. The distance of the movable connection from the first location can be adjusted to cause the flexible headrest assembly to flex outward from the seat to provide a greater or lesser degree of support for a passenger.

11 Claims, 10 Drawing Sheets

(56) References Cited

U.S. PATENT DOCUMENTS

| | | | | |
|---|---|---|---|---|
| 5,383,711 | A * | 1/1995 | Houghteling | A47D 15/006 |
| | | | | 297/397 |
| 5,916,089 | A * | 6/1999 | Ive | A47D 15/006 |
| | | | | 5/655 |
| 5,937,461 | A * | 8/1999 | Dombrowski | A47D 15/003 |
| | | | | 5/655 |
| 5,944,016 | A * | 8/1999 | Ferko, III | A61F 5/05883 |
| | | | | 128/869 |
| 6,398,747 | B1 * | 6/2002 | Rudy, Jr. | A61F 5/055 |
| | | | | 128/DIG. 23 |
| 7,258,677 | B2 * | 8/2007 | Rudy, Jr. | A61F 5/055 |
| | | | | 128/DIG. 23 |
| 7,291,121 | B2 * | 11/2007 | Rudy, Jr. | A61F 5/055 |
| | | | | 128/845 |
| 7,297,127 | B2 * | 11/2007 | Lee | A61F 5/055 |
| | | | | 128/DIG. 23 |
| 7,696,987 | B2 * | 4/2010 | Popovich | G06F 3/041 |
| | | | | 345/179 |
| 2017/0055712 | A1 * | 3/2017 | Hill | B60N 2/667 |
| 2018/0339624 | A1 * | 11/2018 | Leek | B60N 2/874 |
| 2019/0111818 | A1 * | 4/2019 | Leek | B60N 2/876 |

* cited by examiner

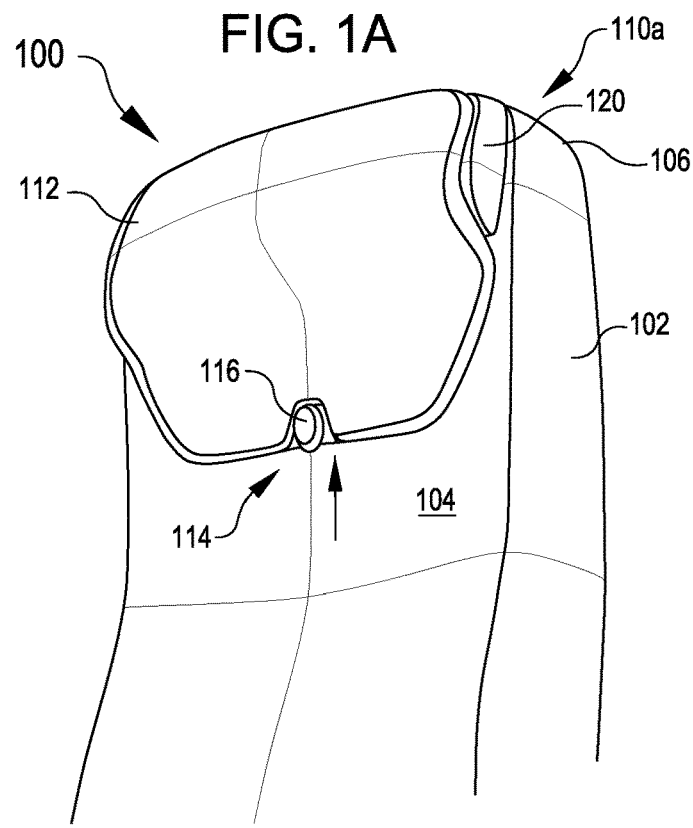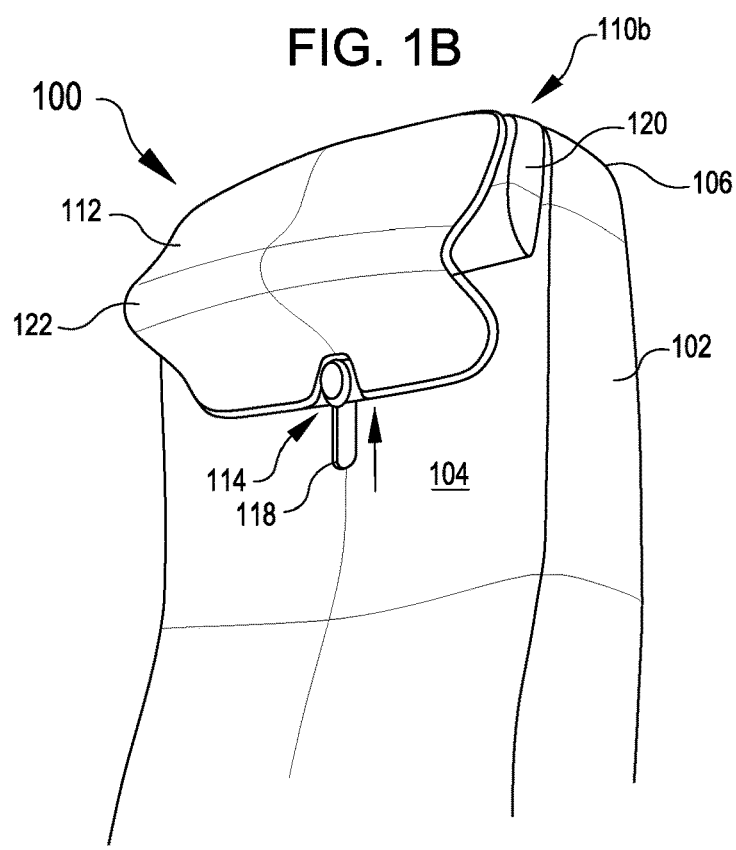

FLEXIBLE HEADREST ASSEMBLY

FIELD OF THE DISCLOSURE

The field of the disclosure relates to passenger seat headrests.

BACKGROUND

Safety, comfort, and weight are among the driving concerns for passenger amenities, particularly in the context of aircraft furnishings. For example, amenities should protect the passenger against traumatic head and neck injury during an impact event, while being comfortable, easy to use, and adjustable to fit a variety of passengers with a range of heights and preferences. A headrest is an important feature of a passenger seat for safety purposes, as it protects the passenger during impact events, and a well-designed headrest can also provide comfortable support for long journeys. Unfortunately, available headrest designs cannot suit all passenger preferences, as preferred headrest configurations vary significantly from person to person depending on the passenger's height, posture, and desired headrest cushion thickness and softness. Headrest solutions available in the context of office or leisure chairs are generally inapplicable, as highly adjustable headrests either take up a prohibitively large amount of space, have a prohibitive weight, or a combination of the above. To that end, novel adjustment mechanisms for passenger headrests are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat can include a seat back having a front side and an upper end, and a headrest assembly connected with the seat back. The headrest assembly can include a semi-rigid, flexible flap connected with the upper end of the seat back at a first location, the semi-rigid flap extending downwardly along the front side of the seat back, and an adjustable connecting assembly including an attachment element attached with the flap and a receiving element attached with the front side of the seat back that connects the flap with the seat back at a second location on the front side of the seat back. The first and second locations at which the semi-rigid, flexible flap are connected with the seat back are separated from each other, and the second location is movable such that a distance between the first and second locations can be increased or decreased. Decreasing the distance between the first and second locations causes the flap to compress and/or fold, thereby extending away from the seat back; and increasing the distance between the first and second locations causes the flap to flatten against the seat back.

According to various embodiments, the attachment element that connects the seat back with the flap at the second location can include a locking protrusion that interfaces with a receiving element such as a track or a discontinuous set of slots that can receive the locking protrusion. The attachment element can be configured as a pushbutton actuator, lever-based actuator, or other suitable actuator. In some embodiments, the attachment element can include a touch fastener, such as a set of hook-and-loop fastening surfaces, where a hook portion of the touch fastener is connected to the flap and a fabric surface configured to receive the hook portion of the touch fastener is connected to the seat back.

According to various embodiments, the headrest assembly can be attached with the seat back by a sliding connection such that a height of the headrest assembly can be adjusted relative to the seat back independent of the semi-rigid flap being adjustable by the adjustable connecting assembly. In some cases, the headrest assembly can further include side-supportive elements that can fold out from the flap to provide support to a user independent of the semi-rigid flap being adjustable.

According to certain embodiments of the present invention, a headrest assembly can include a semi-rigid flap configurable to connect with an upper portion of a seat back at a first location; and an adjustable connecting assembly including an attachment element attached with the flap and a receiving element configurable to attach with a front side of the seat back. The semi-rigid flap of the headrest assembly can configured to be attached with the seat back by the attachment element interfacing with the receiving element on the front side of the seat back at a second location separated from the first location. The second location is movable by way of the adjustment mechanism such that a distance between the first and second locations can be increased or decreased.

According to various embodiments, a headrest assembly can include a locking element having a locked configuration and an unlocked configuration, such that the attachment element can be moved to vary the second location when the locking element is in the unlocked configuration, but can be secured at a selected second location when the locking element is in the locked configuration. Various forms of locking elements are possible. For example, according to some embodiments, a pushbutton actuator can include a spring-biased button that biases the attachment element in the locked configuration when the pushbutton actuator is not depressed and releases the attachment element to the unlocked configuration when the pushbutton actuator is depressed. According to another example, the locking element can include a spring-biased lever mechanically connected with a control arm positioned at a lateral offset from the headrest assembly, where the spring-biased lever biases the attachment element in the locked configuration when the control arm is not rotated and releases the attachment element to the unlocked configuration when the control arm is rotated. In the locked position, a locking protrusion is received in a slot to prevent upward or downward motion of the adjustment mechanism. When unlocked, the adjustment mechanism can be moved to adjust the distance between the first and second locations depending on the slot in which the locking protrusion is received.

In some embodiments, the receiving element can include a continuous track configured to receive the attachment element along a continuous range of second locations, the distance between the first and second locations being adjustable depending on the second location in the range of second locations at which the attachment element is received.

According to certain embodiments of the present invention, a method of adjusting a headrest thickness can include adjusting the effective length of a semi-rigid, flexible flap attached with a seat according to any of the examples described above. The flap can be compressed or flexed outward from the seat by moving an attachment means from the initial second location to a final second location separated from the initial second location such that a distance between the first location and final second location is less than the initial distance between the first location and initial second location, and then securing the attachment means at the final second location. For embodiments having a relatively thin but semi-rigid, flexible flap, increasing the effective thickness of the flap can include bending the flap outward. For embodiments having a thicker, cushioned flap, increasing the effective thickness of the flap can include compressing the flap in a vertical direction so that the cushioning material is pressed outward, causing the flap to increase in thickness.

BRIEF DESCRIPTION OF THE DRAWINGS

FIG. 1A is a perspective view of a first example of a passenger seat with a flexible headrest assembly, according to certain embodiments of the present invention.

FIG. 1B is a perspective view showing the passenger seat of FIG. 1A with the flexible headrest assembly in a flexed position.

DETAILED DESCRIPTION

Figure 2:
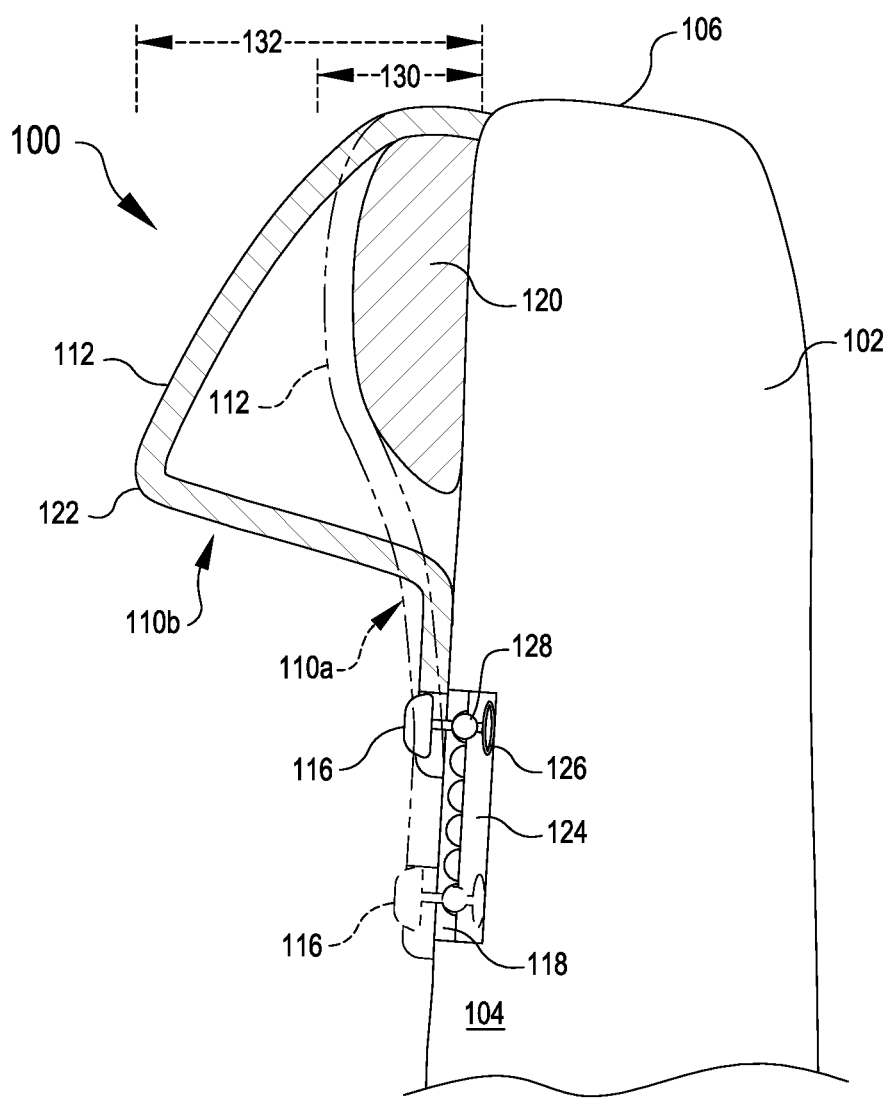
FIG. 2 is a side cross sectional view showing the passenger seat of FIGS. 1A-1B in greater detail.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide an adjustable headrest assembly for passenger seats. While the head rest assemblies are discussed for use with aircraft seats, they are by no means so limited. Rather, embodiments of the headrest assembly may be used in passenger seats or other seats of any type or otherwise as desired.

According to certain embodiments, as shown in FIG. 1A, a passenger seat 100 can include a flexible headrest assembly 110, shown in a relaxed (i.e. flattened or retracted) configuration 110a. The headrest assembly 110 can be integrated with or attached to the seat 100. For example, according to some embodiments the headrest assembly can be built into and directly fastened to the seat 100. In some other embodiments, the headrest assembly 110 can be assembled separately and then attached as a modular component to the seat 100. Headrest assemblies as described herein are described with reference to an aircraft passenger seat, but can be applied to various kinds of seats, including passenger seats for other modes of transportation, e.g. automotive, train, or ship, or may even be applied in home or office furnishings. The structural features described herein are especially useful in providing adjustable head and neck support for a seat where weight, cost, and size are of special concern, but the same structural features can be applied for seating in most contexts.

The seat 100 includes a seat back 102 to which the headrest assembly 110 is attached or integrated. The headrest assembly 110 is connected with the seat back 102 along a forward side 104 of the seat back and proximate to a top end 106 of the seat back, though the exact position of headrest assembly 110 with respect to the seat back may vary depending on the size of the seat and the height of the user for which the seat is intended. The headrest assembly 110 is shown in a relaxed (flattened) configuration 110a, and can flex outwardly to adopt a flexed configuration 110b shown in FIG. 1B, below. The headrest assembly 110 includes a supportive cushion 120 attached to the seat back 102 near the top end 106, and a semi-rigid but flexible flap 112 also attached to the seat back at or near an interface between the seat back and the supportive cushion. In various embodiments, the supportive cushion 120 and the flap 112 may be separately connected to the seat back 102, the flap 112 may be connected directly to the seat back 102 and the supportive cushion 120 may be connected to the seat back 102 through a portion of the flap 112, or the flap 112 may be connected directly to the supportive cushion 120 and connected indirectly to the seat back 102 through the supportive cushion.

In some embodiments, one end of the flap 112 is fixed with respect to the seat back 102 at a first attachment location along the front side 104 of the seat back near the top end 106 of the seat. A second end of the flap 112 opposite the first and typically the bottom end, is attached to the front side 104 of the seat back 102 at a second location, separated from the first, and connected with the seat back 102 by an adjustment mechanism 114 that allows the position of that second location to move up and down along the seat back. In some alternative embodiments, the respective parts of the flap 112 that are fixed and movable can be switched, e.g. with the bottom end fixed to the seat back 102 and the top end movable by means of the adjustment mechanism 114. The first attachment location can vary in size from a single attachment point to a substantial area of the flap 112 along or near the top end of the flap. The second attachment location is typically an attachment point where the adjustment mechanism 114 connects the flap 112 with the seat back 102.

The mobility of the second attachment location due to the adjustment mechanism 114 allows a user of the seat 100 to adjust a straight-line distance between the fixed, first attachment location and the movable, second attachment location, which has the effect of compressing and forcing the flap 112 outward away from the seat back 102, thus increasing the effective thickness of the headrest assembly 110 at the extended portion 122 where the flap 112 separates from the seat back 102. To achieve this change in geometry, a semi-rigid construction is used for the flap 112 such as a polymer foam or elastomer, a textile sleeve encasing a flexible polymer foam or elastomer, or the like. In some embodiments, additional cushioning materials can be included in the flap 112 so as to add loft to the flap or to alter the location at which the flap bends.

According to some embodiments, the adjustment mechanism 114 includes a pushbutton actuator 116 that interacts with a track 118 attached with the seat back 102. Various forms of adjustable pushbutton actuators can be used. In at least some embodiments, the pushbutton actuator 116 is movable between discrete positions along the track 118 at which the actuator is locked while the actuator is released, and from which the actuator can move when depressed. In some other embodiments, the actuator 116 can be moved and locked in place along a continuous range of locations. When the actuator 116 is depressed and pulled downward, the flap 112 flattens as shown in FIG. 1A; and when the actuator is depressed and pushed upward, the flap 112 bends to form an extension 122 that can support a passenger's head or neck, as shown in FIG. 1B.

FIG. 2 is a side cross sectional view showing the passenger seat 100 of FIGS. 1A-1B in greater detail, with specific attention to the adjustment mechanism 114. However, it will be understood by persons of skill in the art that a variety of specific adjustment mechanisms can be used without departing from the core concepts of the disclosure. The adjustment mechanism 114 includes a pushbutton actuator 116 that is connected with the flap 112 and connects with a spring mechanism 126 within a cavity 124 defined by the track 118. The spring mechanism 126 biases the pushbutton actuator 116 outward from the seat back 102. When the pushbutton actuator 116 is depressed by a user, retention features 128 connected with the spring mechanism 126 are retracted and the adjustment mechanism 114 is free to move up and down along the track 118. When the pushbutton actuator 116 is released by the user, the retention features 128 interact with the track 118 and secure the adjustment mechanism 114 in place. The retention features 128 can maintain position by way of friction against the track 118, or alternatively the track 118 can include a series of voids that interact with the retention features 128 to hold them in position. Suitable retention features 128 can include gripping surfaces, e.g. rubber, grooved teeth, or the like; or can include protrusion shaped to interface with features within the track 118.

According to various embodiments, the range of travel associated with the adjustment mechanism 114 in the track 118 can range from 2.5 to 10 cm (about 1" to 4"), preferably from 7.5 to 10 cm (3" to 4"), though in some embodiments the range of travel can exceed 10 cm. The range by which the headrest flap 112 can extend from the seat back 102 varies depending on the flap's thickness, its initial extension 130 when in the relaxed state 110a, and the overall flap length. The flap 112 can vary in length according to the application, e.g., in smaller seats the flap may be as little as 12.5 cm (about 5") in length, up to 38 cm (about 15") in length, or more. The width of the flap 112 can also vary depending on seat size, e.g., from 18 to 64 cm (about 7" to 25"), e.g. from 25 to 64 cm, or from 38 to 64 cm.

The flap 112 can have a relatively thin profile, a thick and cushioned profile, or a hybrid profile falling between the two. In some embodiments, the thickness of the flap 112 can vary from 0.3 to 5 cm (about ⅛" to about 2"), e.g. from 0.3 cm to 3.8 cm (about ⅛" to about 1.5"), or from 0.3 cm to 1.9 cm (about ⅛" to ¾").

The total thickness of the headrest assembly 110 as measured from the seat back 102, can vary depending on the thickness of the flap 112, the size of the supportive cushion 120, and the degree of the extension 122, which is influenced by the specific degree of flexure caused by a user adjusting the adjustment mechanism 114. According to some embodiments, the initial thickness 130 of the headrest assembly 110 when the flap 112 is in the relaxed state 110a can vary from about 0.3 cm to 10 cm (about ⅛" to 4"), preferably from about 2.5 cm to 10 cm (about 1" to 4"), depending on the type of seat and profile, i.e. whether the seat includes a supportive cushion 120 and whether the flap 112 includes additional cushioning. The maximum extended thickness 132 resulting from extension of the flap 112 in the flexed state 110b can vary from about 5 cm up to about 15 cm (about 2" to 6"). However, the initial and extended thicknesses 130, 132 can be varied outside of these ranges by changing the geometry of the flap 112 and the amount of travel available to the adjustment mechanism 114.

Although described with respect to the embodiments of a headrest assembly shown in FIGS. 1A and 1B, it is understood that the ranges of travel, flap lengths, extensions, and other dimensions associated with the physical parameters of the headrest assembly are applicable to all other embodiments of a headrest assembly described in this disclosure, unless explicitly contraindicated.

Figure 3A:
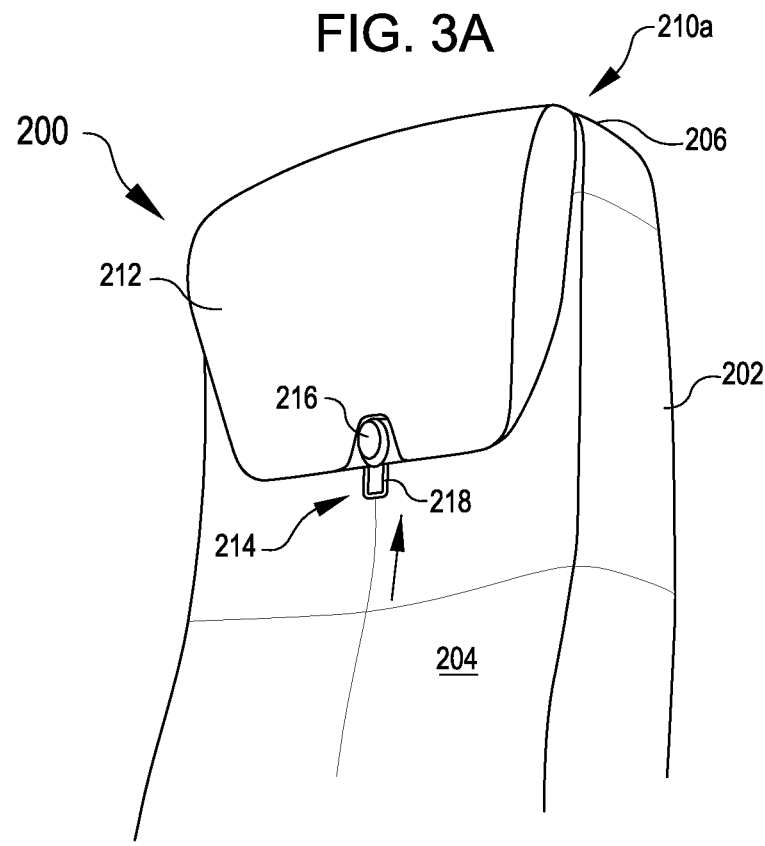
FIG. 3A is a perspective view of a second example of a passenger seat with a cushioned, flexible headrest assembly, according to certain embodiments of the present invention.

According to certain other embodiments, as shown in FIG. 3A, a passenger seat 200 can also include a cushioned, flexible headrest assembly 210, shown in a relaxed (flattened) configuration 210a. The headrest assembly 210 can be integrated with or attached to the seat 200. For example, according to some embodiments the headrest assembly can be built into and directly fastened to the seat 200. In some other embodiments, the headrest assembly 210 can be assembled separately and then attached as a modular component to the seat 200.

The seat 200 includes a seat back 202 to which the headrest assembly 210 is attached or integrated. The headrest assembly 210 is connected with the seat back 202 along a forward side 204 of the seat back and proximate to a top end 206 of the seat back, though the exact position of headrest assembly 210 with respect to the seat back may vary depending on the size of the seat and the height of the user for which the seat is intended. The headrest assembly 210 is shown in a relaxed (flattened) configuration 210a, and can flex outwardly to adopt a flexed configuration 210b shown in FIG. 3B, below. The headrest assembly 210 includes a semi-rigid but flexible flap 212 that is thickened (relative to flap 112, described above) by inclusion of an integrated cushion. The headrest assembly 210 is attached to the seat back at or near the top end 206 of the seat back 202. The flexible flap 212 can include cushioning foam, elastomer, air cushions, or any other suitably flexible and lightweight cushioning material.

Figure 3B:
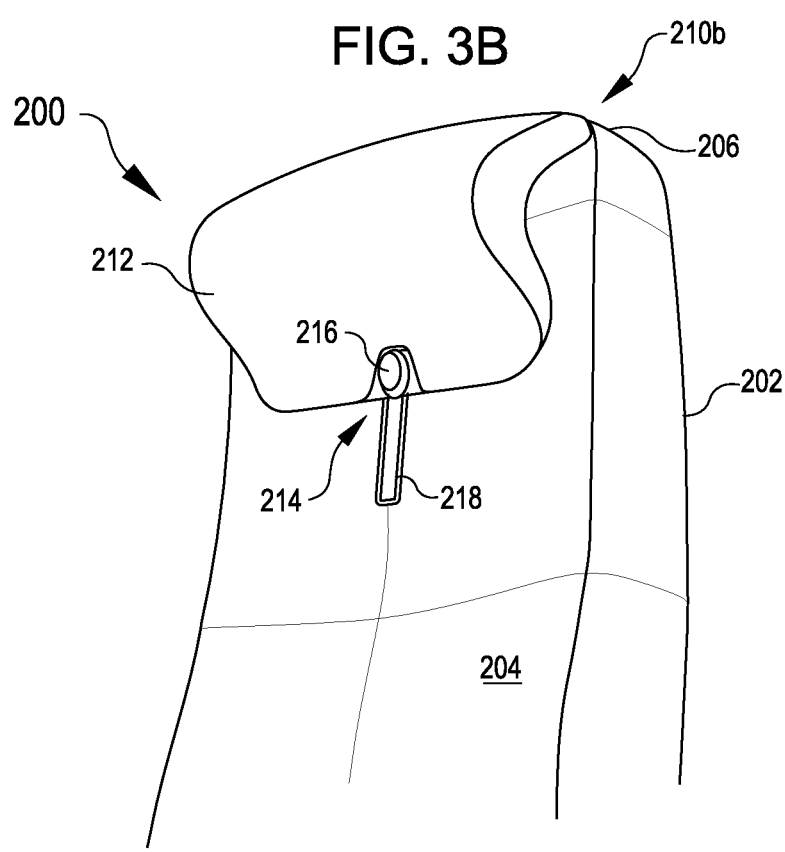
FIG. 3B is a perspective view showing the passenger seat of FIG. 3A with the flexible headrest assembly in a flexed position.

The headrest assembly 210 is shown in a relaxed (flattened) configuration 210a, and can flex outwardly to adopt a flexed configuration 210b shown in FIG. 3B. The flexure of the headrest assembly 210 can be accomplished in any of the methods described above with respect to headrest assembly 110. For example, the headrest assembly 210 can be fixed to the seat back 202 at a first attachment point along or near the top end 206 of the seat back, and movably attached with the seat back 202 at a second attachment location through the adjustment mechanism 214. The mobility of the second attachment location due to the adjustment mechanism 214 allows a user of the seat 200 to adjust a straight-line distance between the fixed, first attachment location and the movable, second attachment location, which has the effect of compressing the cushioned flap 212, which can cause the cushioned flap to either bend outward away from the seat back 202, to increase in thickness between the first and second attachment locations, or both. The adjustment mechanism 214 can include a pushbutton actuator 216 that interacts with a track 218 attached with the seat back 202, as described above, or can include other suitable actuators, some of which are described below.

Figure 4:
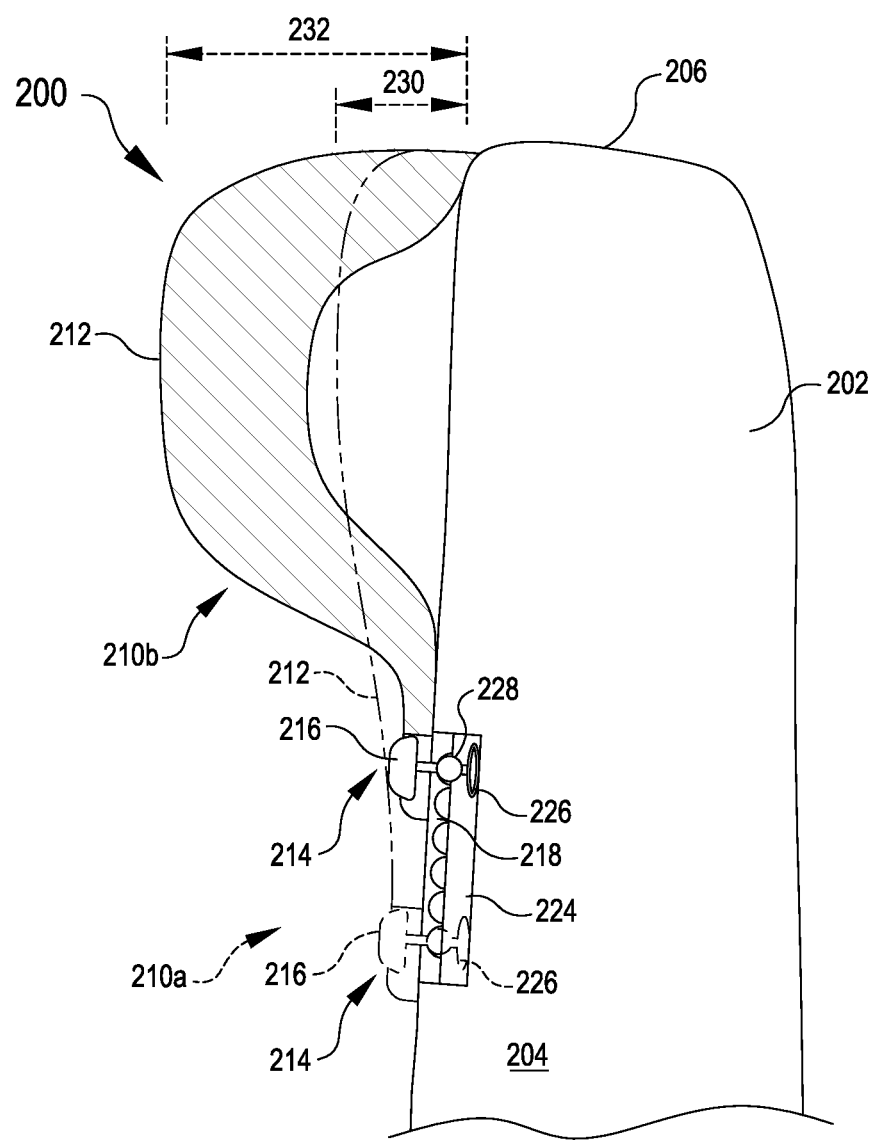
FIG. 4 is a side cross sectional view showing the passenger seat of FIGS. 3A-3B in greater detail.

FIG. 4 is a side cross sectional view showing the passenger seat 200 of FIGS. 3A-3B in greater detail, with specific attention to the adjustment mechanism 214. However, it will be understood by persons of skill in the art that a variety of specific adjustment mechanisms can be used without departing from the core concepts of the disclosure. The adjustment mechanism 214 includes a pushbutton actuator 216 that is connected with the flap 212 and connects with a spring mechanism 226 within a cavity 224 defined by the track 218. The spring mechanism 226 biases the pushbutton actuator 216 outward from the seat back 202. When the pushbutton actuator 216 is depressed by a user, retention features 228 connected with the spring mechanism 226 are retracted and the adjustment mechanism 214 is free to move up and down along the track 218. When the pushbutton actuator 216 is released by the user, the retention features 228 interact with the track 218 and secure the adjustment mechanism 214 in place. The retention features 228 can maintain position by way of friction against the track 218, or alternatively the track 218 can include a series of voids that interact with the retention features 228 to hold them in position. Suitable retention features 228 can include gripping surfaces, e.g. rubber, grooved teeth, or the like; or can include protrusion shaped to interface with features within the track 218.

Figure 5A:
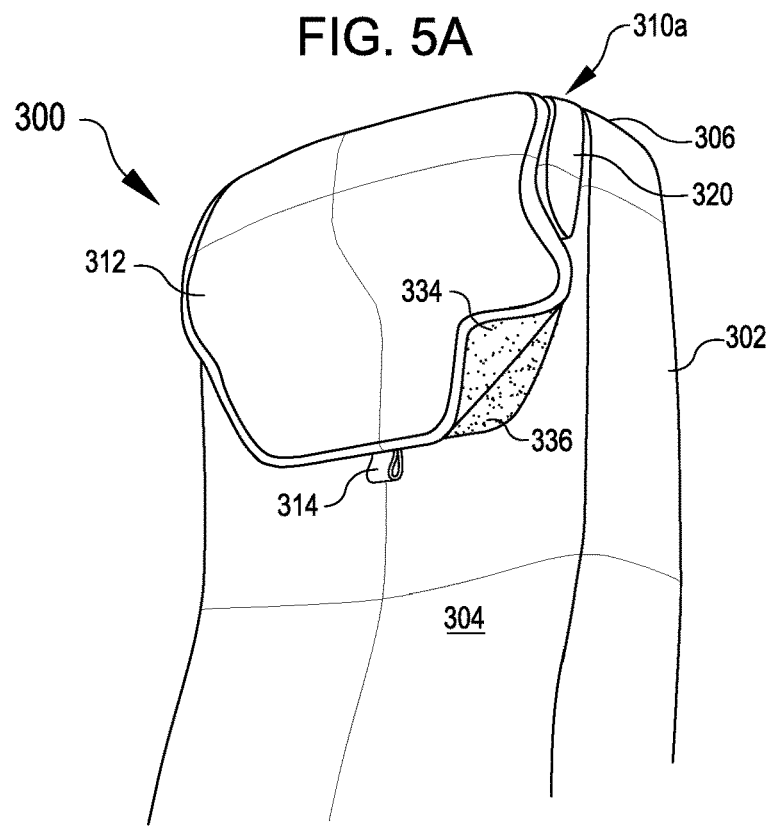
FIG. 5A is a perspective view of a third example of a passenger seat with a flexible headrest assembly that employs a touch-fastening surface, according to certain embodiments of the present invention.
Figure 5B:
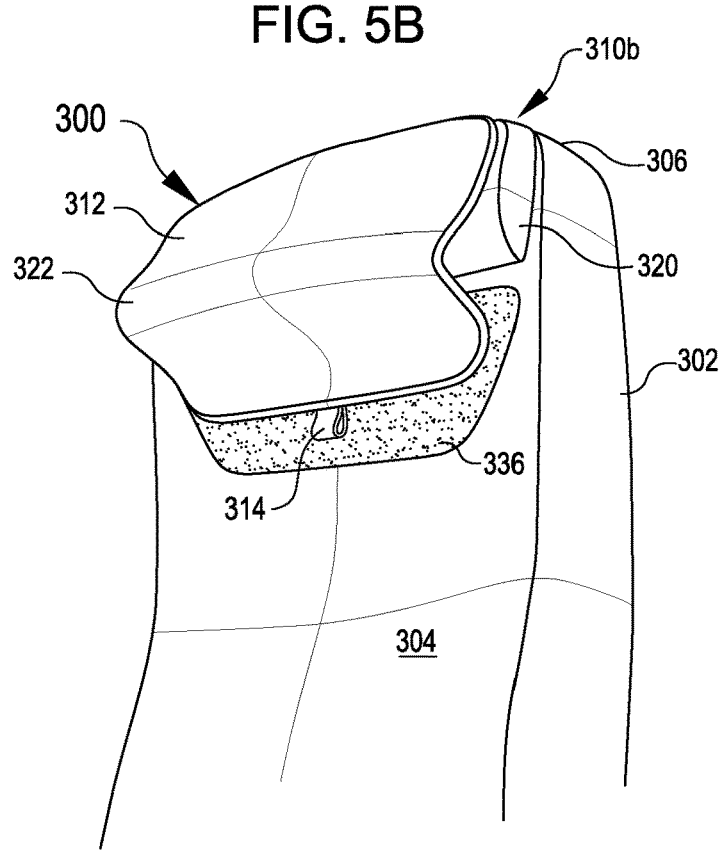
FIG. 5B is a perspective view showing the passenger seat of FIG. 5A with the flexible headrest assembly in a flexed position.

According to certain other embodiments, as shown in FIG. 5A, a passenger seat 300 can also include flexible headrest assembly 310 that employs a touch-fastening surface, shown in a relaxed (flattened) configuration 310a. The headrest assembly 310 can be integrated with or attached to the seat 300. For example, according to some embodiments the headrest assembly can be built into and directly fastened to the seat 300. In some other embodiments, the headrest assembly 310 can be assembled separately and then attached as a modular component to the seat 300. The headrest assembly 310, as shown, includes a similar flap 312 and supportive cushion 320 to those shown in FIGS. 1A-1B, however, it will be understood that the assembly can also use a flap similar to flap 212 shown in FIGS. 3A-3B.

The seat 300 includes a seat back 302 to which the headrest assembly 310 is attached or integrated. The headrest assembly 310 is connected with the seat back 302 along a forward side 304 of the seat back and proximate to a top end 306 of the seat back, though the exact position of headrest assembly 310 with respect to the seat back may vary depending on the size of the seat and the height of the user for which the seat is intended. The headrest assembly 310 is shown in the relaxed configuration 310a, and can flex outwardly to adopt a flexed configuration 310b shown in FIG. 3B, below. The flexible flap 312 can include cushioning foam, elastomer, air-filled cushions, or any other suitably flexible and lightweight cushioning material. When deployed or flexed, the flap 312 bends to form an extension 322 that can further support a passenger's head or neck.

The flexure of the headrest assembly 310 can be accomplished in any of the methods described above with respect to headrest assemblies 110 or 220. For example, the headrest assembly 310 can be fixed to the seat back 302 at a first attachment point along or near the top end 306 of the seat back, and movably attached with the seat back 302. Unlike the headrest assemblies 110 or 210, the headrest assembly 310 includes a first touch-fastening surface 334 configured to removably attach with a second touch-fastening surface 336 on the front portion 304 of the seat back 302. In some embodiments, the touch-fastening surfaces 334, 336 are compatible sheets of a hook-and-loop fastener (e.g. VELCRO), but other touch-fastening surfaces or removable fasteners are possible such as, but not limited to, pressure sensitive adhesives, deformable polymer touch-fasteners, snaps, hook-and-eye fasteners, buttons, or comparable fasteners. In some embodiments, a grasping element 314, such as a fabric loop, is provided for ease of use. Typical touch fasteners include a course surface (e.g. the "hook" surface) and a soft or felted surface (e.g. the "loop" surface). Where such fasteners are used, the soft or felted surface is typically used as the second touch-fastening surface 336 and placed on the seat back 302 to prevent discomfort or snagging on passenger clothing.

Some embodiments of the headrest assembly 310 with touch-fastening surfaces 334, 336 can be removed entirely from the seat back 302. For example, in some embodiments, a fixed attachment between the flexible flap 312 and seat back 302 at the top end 306 of the seat back can be replaced with a removable attachment, i.e. removable fasteners such as buttons, snaps, zippers, hook-and-loop, or the like, so that a user can entirely remove the flap 212 from the seat back 202. This removable option can be advantageous when used to reduce the amount of support when less support is desired, or to facilitate removal of the headrest assembly 310 for cleaning or replacement of the headrest assembly.

Figure 6:
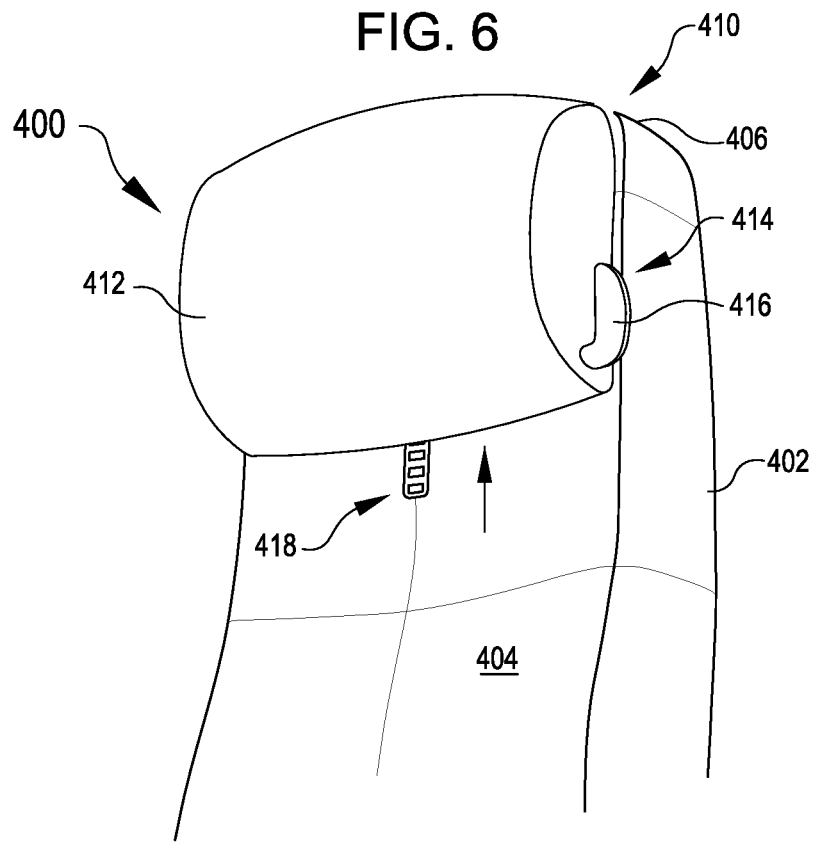
FIG. 6 is a perspective view of a fourth example of a passenger seat with a flexible headrest assembly that employs a lever-actuated adjustment mechanism, according to certain embodiments of the present invention.

According to certain other embodiments, as shown in FIG. 6, a passenger seat 400 can include a flexible headrest assembly 410 with a lever-actuated adjustment mechanism 414. The seat 400 includes a seat back 402 to which the headrest assembly 410 is attached or integrated. The headrest assembly 410 is connected with the seat back 402 along a forward side 404 of the seat back and proximate to a top end 406 of the seat back. The headrest assembly 410 is shown in a relaxed (flattened) configuration, but can flex outwardly to adopt a flexed configuration, as described with respect to headrest assemblies 110, 210, and 310 above. The headrest assembly 410 includes a semi-rigid but flexible flap 412. The headrest assembly 410 is attached to the seat back at or near the top end 406 of the seat back 402. The flexible flap 412 can include cushioning foam, elastomer, air cushions, or any other suitably flexible and lightweight cushioning material.

The flexure of the headrest assembly 410 can be accomplished by moving a movable attachment point corresponding to an adjustment mechanism 414 where the flap 412 is attached to the front side 404 of the seat back 402. For example, the headrest assembly 410 can be fixed to the seat back 402 at a first attachment point along or near the top end 406 of the seat back, and movably attached with the seat back 402 at a second attachment location through the adjustment mechanism 414. The mobility of the second attachment location due to the adjustment mechanism 414 allows a user of the seat 400 to adjust a straight-line distance between the fixed, first attachment location and the movable, second attachment location, which has the effect of compressing the cushioned flap 412, which can cause the cushioned flap to either bend outward away from the seat back 402 or to increase in thickness between the first and second attachment locations. The adjustment mechanism 414 as shown in FIG. 6 is a lever-actuated adjustment mechanism with control arms 416 extending from the sides of the flap 412, and attaches with the seat back 402 along a track 418.

Figure 7:
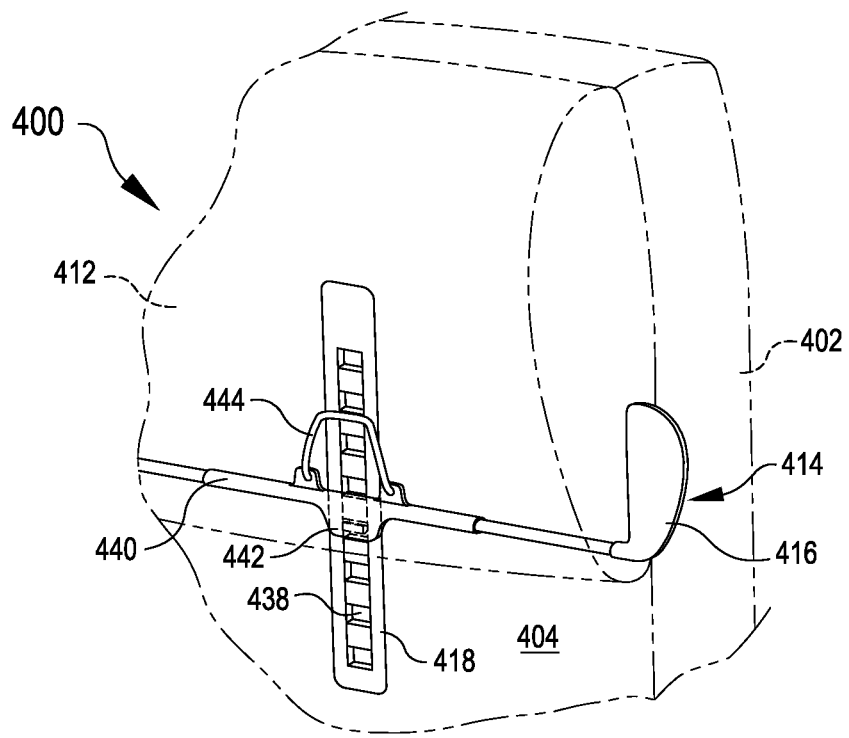
FIG. 7 is a detailed perspective view showing the passenger seat of FIG. 6 and illustrating the lever-actuated adjustment mechanism in greater detail.

FIG. 7 is a detailed perspective view showing the passenger seat 400 of FIG. 6 that illustrates the lever-actuated adjustment mechanism 414 in greater detail. The lever-actuated adjustment mechanism 414 can be adjusted by actuating the control arm 414 and moving the adjustment mechanism up or down along a track 418 connected with the seat back 402. The adjustment mechanism includes a rotating bar 440 connected with the control arm 416 that rotates a locking protrusion 442 in order to cause the locking protrusion to interfere with a series of slots 438 in the track 418. The motion of the rotating bar 440 is opposed by a spring element 444 so that the bar and control arm 416 revert to a locked position by default, where the locked position biases the locking protrusion 442 into the track 418 to prevent the bar from moving up and down along the track. When the control arm 416 is actuated by a user, the rotating bar 440 causes the locking protrusion 442 to rotate out of the track 418, freeing the bar 440 to move up and down along the track 418. The adjustment mechanism 414 can be held in contact with the track by a variety of slidable attachment features that are omitted for clarity.

Figure 8:
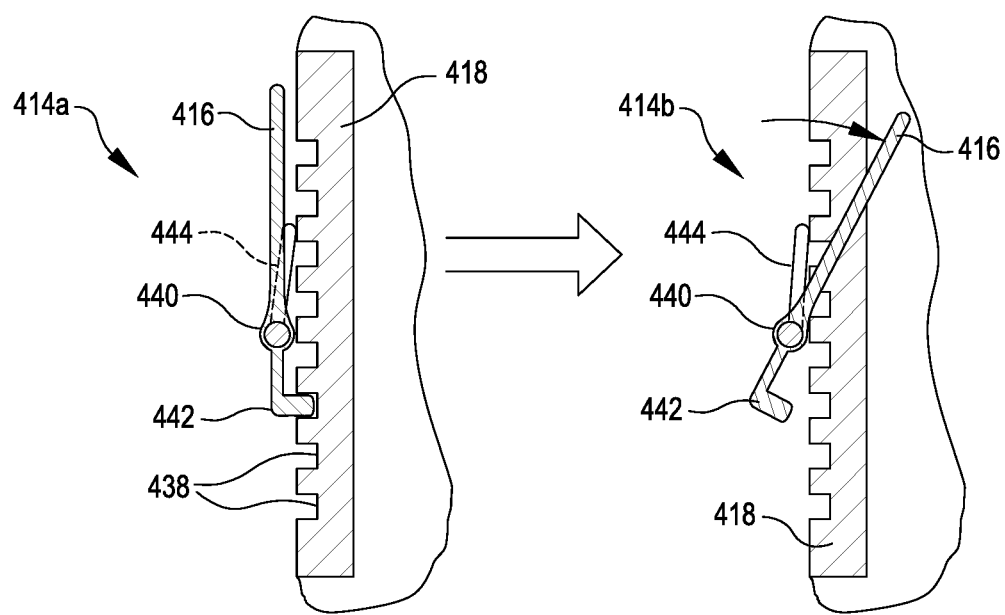
FIG. 8 is a side section view showing the passenger seat of FIGS. 6-7 and illustrating the lever-actuated mechanism transitioning between a locked and unlocked configuration.

FIG. 8 is a side section view of passenger seat 400 of FIGS. 6-7 that shows the lever-actuated adjustment mechanism 414 transitioning between a locked and unlocked configuration 414a, 414b. In the locked configuration 414a, the locking protrusion 442 is inserted in one of the series of slots 438 of the track 418, and the adjustment mechanism 414 is biased in the locked configuration by the spring element 416. In the unlocked configuration 414b, the locking protrusion 442 is removed from the slots 438 of the track 418 by action of the control arm 416 against the biasing force of the spring element 416.

Figure 9A:
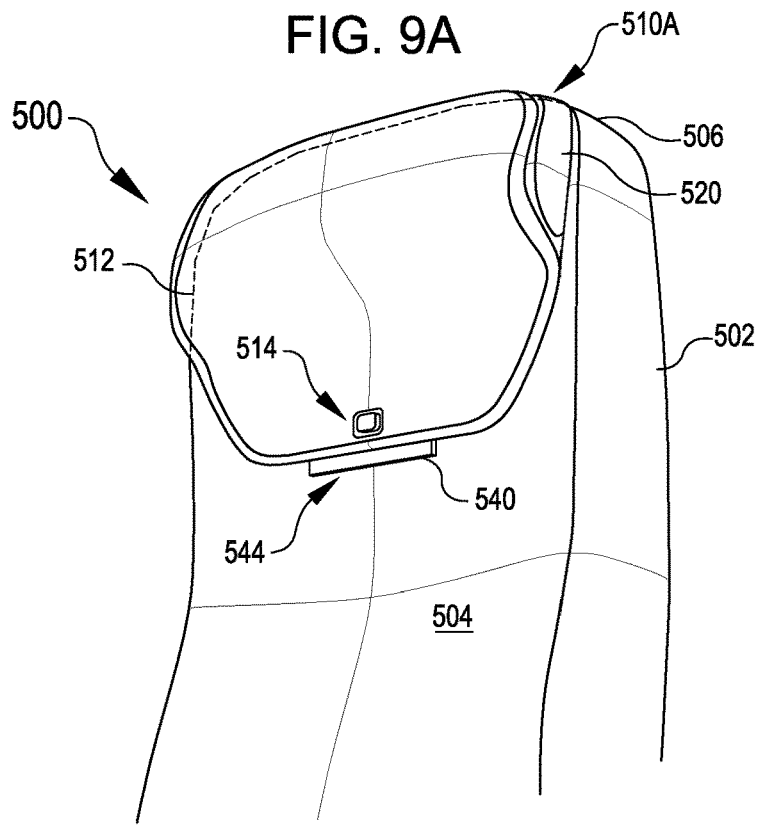
FIG. 9A is a perspective view of a fifth example of a passenger seat with a flexible headrest assembly that adjusts in height relative to the seat back, according to certain embodiments of the present invention.
Figure 9B:
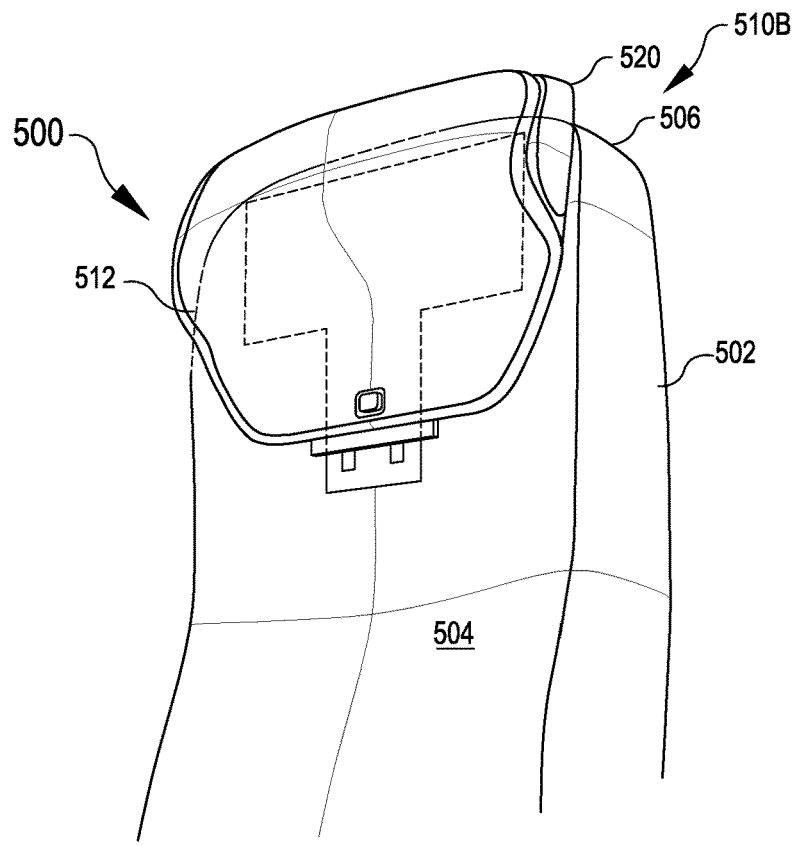
FIG. 9B is a perspective view showing the passenger seat of FIG. 9A in an extended configuration.

Headrest assemblies as disclosed herein can also be adjusted in vertical position independent of flexure to change their effective thickness. According to certain embodiments, as shown in FIG. 9A, a passenger seat 500 can include a flexible headrest assembly 510 that adjusts in height relative to the seat back 502, with the flexible headrest assembly in a lowered configuration 510a. FIG. 9B shows the headrest assembly 510 in a raised configuration 510b. The seat 500 includes a seat back 502 to which the headrest assembly 510 is attached. The headrest assembly 510 is connected with the seat back 502 along a forward side 504 of the seat back and proximate to a top end 506 of the seat back, though the exact position of headrest assembly 510 with respect to the seat back may vary depending on the size of the seat and the height of the user for which the seat is intended. The headrest assembly 510 can include any of the embodiments of flexible flaps and adjustment mechanisms described above, but is shown here using a pushbutton adjustment mechanism 514 and flexible flap 512 connected with the seat back 502 over a supportive cushion 520.

Figure 10:
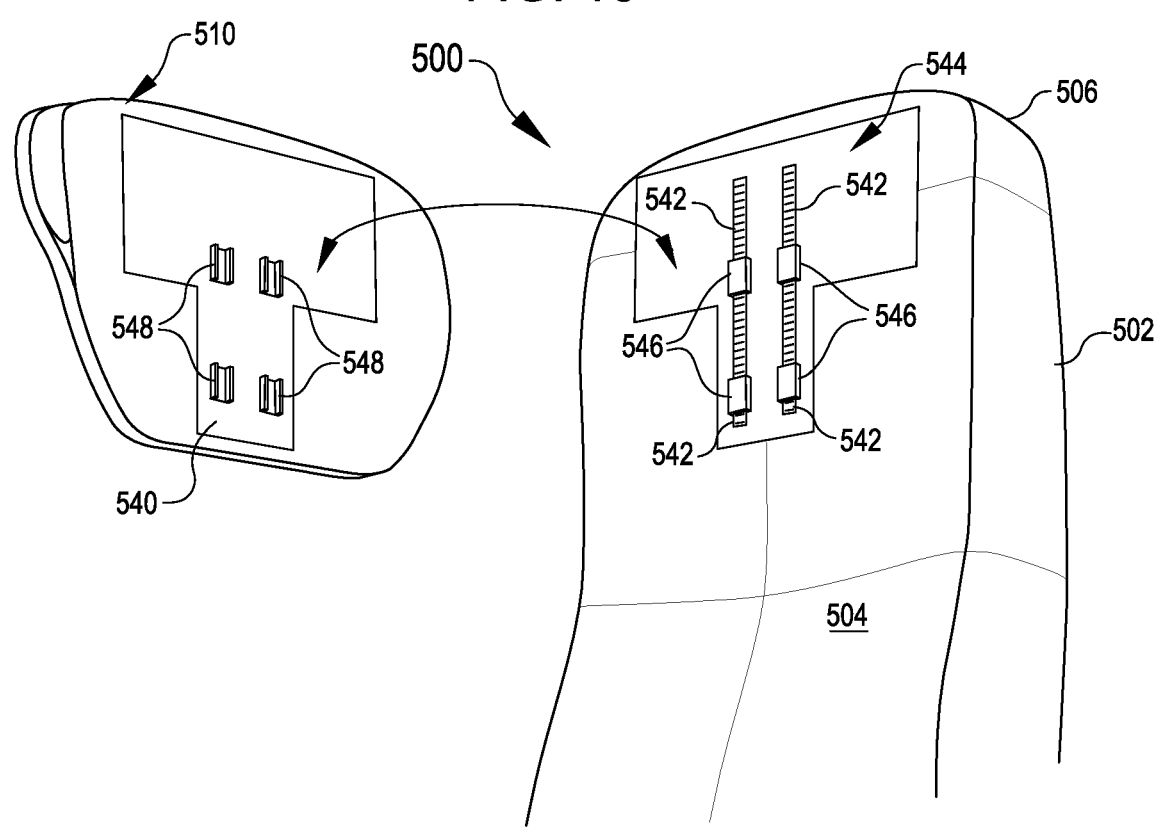
FIG. 10 is a perspective view showing the passenger seat of FIGS. 9A-9B with the flexible headrest assembly removed to show an adjustable slide housing.

The headrest assembly 510 as a whole is connected with a headrest assembly panel 540 that can be adjusted in height relative to the seat back 502 by sliding the headrest assembly via a slide housing 544 along tracks 542. The panel 540, slide housing 544, tracks 542, and any other supportive or connective parts in the headrest assembly 510 can be formed of materials including but not limited to aluminum, stainless steel, aramid fibers, polycarbonate, polypropylene, other metallic materials, composite materials, or other similar materials. FIG. 10 is a perspective view showing the passenger seat 500 of FIGS. 9A-9B with the flexible headrest assembly 510 removed to show the adjustable slide housing 544 in greater detail. As shown, the slide housing 544 can include tracks 542 and sliding elements 546 thereon that can connect with connection points 548 along the panel 540 and operable to allow motion of headrest assembly 510 with respect to the seat back 502. It will be understood that other adjustment mechanisms can be used in conjunction with the movable panel 540. For example, in some embodiments, the panel 540 may be flexible, e.g. to allow side portions of the panel to deform to add side support when acted on by a user.

Figure 11A:
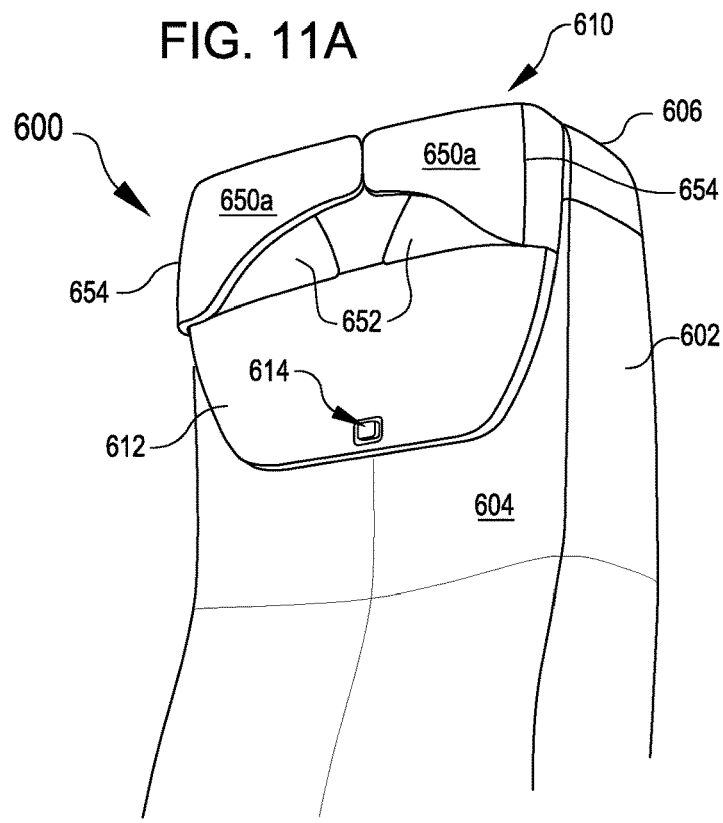
FIG. 11A is a perspective view of a sixth example of a passenger seat with a flexible headrest assembly that includes side supportive features, according to certain embodiments of the present invention.

According to certain other embodiments, as shown in FIG. 11A, a passenger seat 600 can include a flexible headrest assembly 610 with side supportive features 650a, 650b. The seat 600 includes a seat back 602 to which the headrest assembly 610 is attached or integrated. The headrest assembly 610 is connected with the seat back 602 along a forward side 604 of the seat back and proximate to a top end 606 of the seat back, though the exact position of headrest assembly 610 with respect to the seat back may vary depending on the size of the seat and the height of the user for which the seat is intended.

Figure 11B:
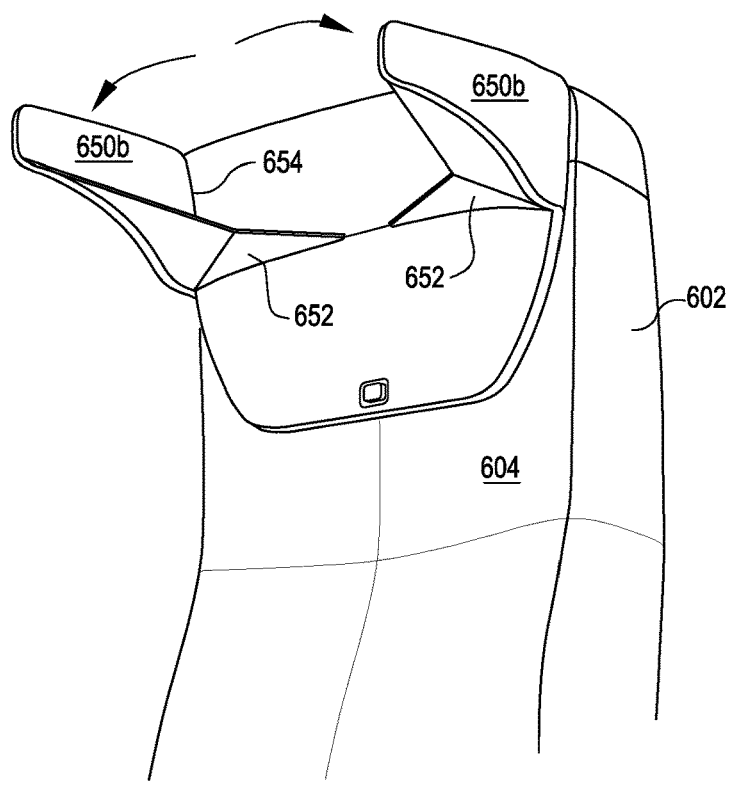
FIG. 11B is a perspective view showing the passenger seat of FIG. 11A with side supportive features extended for passenger use.

The headrest assembly 610 can include any of the embodiments of flexible flaps and adjustment mechanisms described above, but is shown here using a pushbutton adjustment mechanism 614 and flexible flap 612 connected with the seat back 602 over a supportive cushion 620. The headrest assembly 610 includes side supportive features 650a, 650b connected with the flexible flap 612 that can be flexed outward by a user via deformable hinges 654 connecting the side supportive features with the flexible flap 612. In some embodiments, the side supportive features 650a, 650b are also connected with the flexible flap 612, or alternatively to the seat back 602, by a pair of flexible wings 652 that can form a cradle to support a passenger's head and neck when the headrest assembly 610 is in use. FIG. 11B is a perspective view showing the passenger seat 600 of FIG. 11A with side supportive features 650a, 650b extended for passenger use.

In the following, further examples are described to facilitate the understanding of the disclosure:

Example A. A seat, including a seat back having a front side and an upper end; and a headrest assembly connected with seat back, the headrest assembly comprising: a semi-rigid flap connected with the upper end of the seat back at a first location, the semi-rigid flap extending downwardly along the front side of the seat back; and an adjustable connecting assembly comprising an attachment element attached with the flap and a receiving element attached with the front side of the seat back, the adjustable connecting assembly positioned to connect the flap with the seat back at a second location on the front side of the seat back and separated from the first location, the second location being movable such that a distance between the first and second locations can be increased or decreased, wherein decreasing the distance between the first and second locations causes the flap to extend away from the seat back.

Example B. The seats of any of the preceding or subsequent examples, wherein the attachment element comprises a locking protrusion and the receiving element comprises a discontinuous plurality of slots configured to receive the locking protrusion at a plurality of second locations corresponding to the plurality of slots, the distance between the first and second locations being adjustable depending on the slot of the discontinuous plurality of slots into which the locking protrusion is received.

Example C. The seats of any of the preceding or subsequent examples, wherein the attachment element is configurable between a locked configuration and an unlocked configuration, wherein the locking protrusion can be moved to vary the second location when the attachment element is in the unlocked configuration, and wherein the attachment element is secured at the second location when the attachment element is in the locked configuration.

Example D. The seats of any of the preceding or subsequent examples, wherein the attachment element comprises a hook portion of a touch fastener and wherein the receiving element comprises a fabric surface configured to receive the hook portion of the touch fastener.

Example E. The seats of any of the preceding or subsequent examples, wherein the semi-rigid flap is fixedly connected to the upper end of the seat back.

Example F. The seats of any of the preceding or subsequent examples, further comprising a cushion connected with the upper end of the seat back between the semi-rigid flap and the front of the seat back.

Example G. The seats of any of the preceding or subsequent examples, wherein the headrest assembly is attached with the seat back by a sliding connection such that a height of the headrest assembly can be adjusted relative to the seat back independent of the a semi-rigid flap being adjustable by the adjustable connecting assembly.

Example H. The seats of any of the preceding examples, wherein the distance between the first and second locations can be varied by moving the second location up to 10 cm (about 4") closer to the first location from an initial second location.

Example G. A headrest assembly, comprising a semi-rigid flap configurable to connect with an upper portion of a seat back at a first location; and an adjustable connecting assembly comprising an attachment element attached with the flap and a receiving element configurable to attach with a front side of the seat back, the receiving element and attachment element being operable to connect the flap with the front side of the seat back at a second location separated from the first location, the second location being movable such that a distance between the first and second locations can be increased or decreased, wherein decreasing the distance between the first and second locations causes the flap to extend away from the seat back.

Example H. The headrest assemblies of any of the preceding or subsequent examples, wherein the attachment element comprises a locking element having a locked configuration and an unlocked configuration, wherein the attachment element can be moved to vary the second location when the locking element is in the unlocked configuration, and wherein the attachment element is secured at the second location when the locking element is in the locked configuration.

Example I. The headrest assemblies of any of the preceding or subsequent examples, wherein the locking element comprises a pushbutton actuator comprising a spring-biased button that biases the attachment element in the locked configuration when the pushbutton actuator is not depressed and releases the attachment element to the unlocked configuration when the pushbutton actuator is depressed.

Example J. The headrest assemblies of any of the preceding or subsequent examples, wherein the locking element comprises a spring-biased control arm mechanically connected with a control arm positioned at a lateral offset from the headrest assembly, wherein the spring-biased control arm biases the attachment element in the locked configuration when the control arm is not rotated and releases the attachment element to the unlocked configuration when the control arm is rotated.

Example K. The headrest assemblies of any of the preceding or subsequent examples, wherein the attachment element comprises a locking protrusion, and wherein the receiving element comprises a discontinuous plurality of slots configured to receive the locking protrusion at a plurality of second locations, the distance between the first and second locations being adjustable depending on the slot of the discontinuous plurality of slots into which the locking protrusion is received.

Example L. The headrest assemblies of any of the preceding or subsequent examples, wherein the receiving element comprises a continuous track configured to receive the attachment element along a continuous range of second locations, the distance between the first and second locations being adjustable depending on the second location in the range of second locations at which the attachment element is received.

Example M. The headrest assemblies of any of the preceding or subsequent examples, further comprising an additional cushion connected with the flap and configurable to connect with the upper portion of the seat back proximate to the first location.

Example N. The headrest assemblies of any of the preceding or subsequent examples, wherein the attachment element comprises a hook portion of a touch fastener and wherein the receiving element comprises a fabric surface configured to receive the hook portion of the touch fastener.

Example O. The headrest assemblies of any of the preceding examples, wherein the flap further comprises one or more side-supportive element that extend forward from one or more sides of the flap.

Example P. A method of adjusting a headrest thickness, the method comprising: with a seat comprising a headrest assembly that comprises a semi-rigid flap fixedly connected with an upper portion of the seat at a first location and movably connected with a receiving element connected with a front of the seat by an attachment means at an initial second location separated from the first location by an initial distance; releasing the attachment means at the initial second location so that the attachment means can move relative to the initial second location; causing the flap to flex outward from the seat by moving the attachment means from the initial second location to a final second location separated from the initial second location such that a distance between the first location and final second location is less than the initial distance between the first location and initial second location; and securing the attachment means at the final second location.

Example Q. The method of either of the preceding or subsequent examples, wherein the attachment means comprises a locking protrusion, and the receiving element comprises a discontinuous plurality of slots configured to receive the locking protrusion at a plurality of second locations, and wherein: unlocking the attachment means comprises removing the locking protrusion from a first slot of the plurality of slots; and locking the attachment means at the final second location comprises inserting the locking protrusion at a second slot different from the first slot of the plurality of slots.

Example R. The method of any of the preceding examples, wherein the attachment means further comprises a spring-biased actuator configured to maintain the attachment means in a locked configuration and configured to release the attachment means to an unlocked configuration when the actuator is moved by a user, and wherein: unlocking the attachment means comprises moving the actuator; and locking the attachment means comprises releasing the actuator.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat, comprising:
    a seat back having a front side and an upper end; and
    a headrest assembly connected with seat back, the headrest assembly comprising:
        a semi-rigid flap connected with the upper end of the seat back at a first location, the semi-rigid flap extending downwardly along the front side of the seat back; and
        an adjustable connecting assembly comprising an attachment element attached to the flap and a receiving element attached to the front side of the seat back and including a track extending longitudinally in an upward and downward direction, the adjustable connecting assembly positioned to connect the flap to the seat back at a second location on the front side of the seat back and separated from the first location, the second location being movable such that a distance between the first and second locations can be increased or decreased, wherein decreasing the distance between the first and second locations causes the flap to extend away from the seat back,
        wherein the attachment element comprises a locking protrusion and the receiving element comprises a discontinuous plurality of slots disposed along a length of the track and configured to receive the locking protrusion at a plurality of second locations, including the second location, corresponding to the plurality of slots, the distance between the first and second locations being adjustable depending on the slot of the discontinuous plurality of slots into which the locking protrusion is received, and wherein the locking protrusion is configured for movement in a direction perpendicular to the upward and downward direction and is spring-biased to maintain the locking protrusion in a locked configuration and is configured to release the locking protrusion to an unlocked configuration when an actuator is moved by the user against a bias of a spring.

2. The seat of claim 1, wherein the attachment element is configurable between a locked configuration and an unlocked configuration, wherein the locking protrusion can be moved to vary the second location when the attachment element is in the unlocked configuration, and wherein the attachment element is secured at the second location when the attachment element is in the locked configuration.

3. The seat of claim 1, wherein the semi-rigid flap is fixedly connected to the upper end of the seat back.

4. The seat of claim 1, further comprising a cushion connected with the upper end of the seat back between the semi-rigid flap and the front of the seat back.

5. The seat of claim 1, wherein the headrest assembly is attached with the seat back by a sliding connection such that a height of the headrest assembly can be adjusted relative to the seat back independent of the semi-rigid flap being adjustable by the adjustable connecting assembly.

6. The seat of claim 1, wherein the distance between the first and second locations can be varied by moving the second location up to 10 cm (about 4") closer to the first location from an initial second location.

7. A headrest assembly, comprising:
    a semi-rigid flap configurable to connect with an upper portion of a seat back at a first location; and
    an adjustable connecting assembly comprising an attachment element attached to the flap and a receiving element configurable to attach to a front side of the seat back and including a track extending longitudinally in an upward and downward direction, the receiving element and attachment element being operable to connect the flap to the front side of the seat back at a second location separated from the first location, the second location being movable such that a distance between the first and second locations can be increased or decreased, wherein decreasing the distance between the first and second locations causes the flap to extend away from the seat back,
    wherein the attachment element comprises a locking element having a locked configuration and an unlocked configuration, wherein the attachment element can be moved to vary the second location when the locking element is in the unlocked configuration, and wherein the attachment element is secured at the second location when the locking element is in the locked configuration, and wherein the locking element comprises a pushbutton actuator configured for movement in a direction perpendicular to the upward and downward direction and comprising a spring-biased button that biases the attachment element in the locked configuration when the pushbutton actuator is not depressed and releases the attachment element to the unlocked configuration when the pushbutton actuator is depressed.

8. The headrest assembly of claim 7, wherein the locking element comprises a spring-biased lever mechanically connected with a control arm positioned at a lateral offset from the headrest assembly, wherein the spring-biased lever biases the attachment element in the locked configuration when the control arm is not rotated and releases the attachment element to the unlocked configuration when the control arm is rotated.

9. The headrest assembly of claim 7, further comprising an additional cushion connected with the flap and configurable to connect with the upper portion of the seat back proximate to the first location.

10. A method of adjusting a headrest thickness, the method comprising:
  with a seat comprising a headrest assembly that comprises a semi-rigid flap fixedly connected to an upper portion of the seat at a first location and movably connected to a receiving element comprising an elongate track connected to a front of the seat by an attachment means at an initial second location separated from the first location by an initial distance in a downward direction from the first location;
  releasing the attachment means at the initial second location so that the attachment means can move in an upward direction or the downward direction along a length of the track relative to the initial second location;
  causing the flap to flex outward from the seat by moving the attachment means from the initial second location to a final second location separated from the initial second location such that a final distance between the first location and final second location is less than the initial distance between the first location and initial second location; and
  securing the attachment means at the final second location,
  wherein the attachment means comprises a locking protrusion, and the receiving element comprises a discontinuous plurality of slots disposed along the length of the track configured to receive the locking protrusion at a plurality of second locations that include the initial second location and the final second location, and wherein:
    unlocking the attachment means comprises removing the locking protrusion from a first slot of the plurality of slots; and
    locking the attachment means at the final second location comprises inserting the locking protrusion at a second slot different from the first slot of the plurality of slots, and wherein the attachment means further comprises a spring-biased actuator configured for movement in a direction perpendicular to the upward and downward directions and configured to maintain the attachment means in a locked configuration and configured to release the attachment means to an unlocked configuration when the actuator is moved by a user against a bias of a spring, and wherein:
    unlocking the attachment means comprises moving the actuator; and
    locking the attachment means comprises releasing the actuator.

11. A method of adjusting a headrest thickness, the method comprising:
  with a seat comprising a headrest assembly that comprises a semi-rigid flap fixedly connected to an upper portion of the seat at a first location and movably connected to a receiving element comprising an elongated track connected to a front of the seat by an attachment means at an initial second location separated from the first location by an initial distance in a downward direction from the first location;
  releasing the attachment means at the initial second location so that the attachment means can move in an upward direction or the downward direction along a length of the track relative to the initial second location;
  causing the flap to flex outward from the seat by moving the attachment means from the initial second location to a final second location separated from the initial second location such that a final distance between the first location and final second location is less than the initial distance between the first location and initial second location; and
  securing the attachment means at the final second location,
  wherein the attachment means further comprises a spring-biased actuator configured for movement in a direction perpendicular to the upward and downward directions and configured to maintain the attachment means in a locked configuration and configured to release the attachment means to an unlocked configuration when the actuator is moved by a user against a bias of a spring, and wherein:
    unlocking the attachment means comprises moving the actuator; and
    locking the attachment means comprises releasing the actuator.

* * * * *